(12) United States Patent
Zhang et al.

(10) Patent No.: US 10,150,043 B2
(45) Date of Patent: Dec. 11, 2018

(54) INTERACTIVE SMART BEADS

(71) Applicant: Microsoft Technology Licensing, LLC, Redmond, WA (US)

(72) Inventors: Haiyan Zhang, London (GB); Nicolas Villar, Cambridge (GB); James William Scott, Cambridge (GB); Alexandra Keeley Bunting, London (GB); Greg Saul, London (GB); Lee Jason Schuneman, London (GB); Philip Robert Harrison, Chalfont St Giles (GB); Jonathan Leslie Venables, London (GB); Simon Terence Prodger, Horsham (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 403 days.

(21) Appl. No.: 14/204,483

(22) Filed: Mar. 11, 2014

(65) Prior Publication Data

US 2015/0258458 A1 Sep. 17, 2015

(51) Int. Cl.
*A63F 13/95* (2014.01)
*H04W 4/00* (2018.01)
(Continued)

(52) U.S. Cl.
CPC ............ *A63F 13/95* (2014.09); *A63F 13/235* (2014.09); *G06F 1/163* (2013.01); *H04L 67/38* (2013.01); *H04W 4/00* (2013.01)

(58) Field of Classification Search
None
See application file for complete search history.

(56) References Cited

U.S. PATENT DOCUMENTS 4,883,440 A 11/1989 Bolli
6,149,490 A 11/2000 Hampton et al.
(Continued)

FOREIGN PATENT DOCUMENTS

CN 1834906 A 9/2006
CN 103281928 A 9/2013
(Continued)

OTHER PUBLICATIONS

Schweikardt, Eric, "Designing Modular Robots", Nov. 19, 2013, Available at: http://www.cmu.edu/architecture/research/grad_work/2009_phdcd_schweikardt_eric.pdf.
(Continued)

*Primary Examiner* — Robert T Clarke, Jr.
(74) *Attorney, Agent, or Firm* — Alleman Hall Creasman & Tuttle LLP

(57) ABSTRACT

Interactive smart beads are described. The beads are attached to a connecting element and form a fashion item such as a necklace or bracelet. The connecting element detects the presence of beads which are part of the fashion item and also beads which are part of nearby fashion items. The connecting element also autonomously generates interactions between two or more detected beads and transmits data about the interactions to a software experience so that a user can view a graphical representation of the interactions. In various examples each bead represents a character, environment, object, etc. and the software experience displays an animated story based on the characters, environments, objects, etc. represented by the beads involved in an interaction.

20 Claims, 8 Drawing Sheets

(51) Int. Cl.
  *H04L 29/06* (2006.01)
  *G06F 1/16* (2006.01)
  *A63F 13/235* (2014.01)

(56) References Cited

U.S. PATENT DOCUMENTS

| | | | |
|---|---|---|---|
| 6,290,565 | B1 | 9/2001 | Galyean, III et al. |
| 6,454,624 | B1 | 9/2002 | Duff et al. |
| 6,471,565 | B2 | 10/2002 | Simeray |
| 6,526,375 | B1 | 2/2003 | Frankel et al. |
| 6,575,802 | B2 | 6/2003 | Yim et al. |
| 6,682,392 | B2 | 1/2004 | Chan |
| 6,773,322 | B2 | 8/2004 | Gabai et al. |
| 6,773,344 | B1 | 8/2004 | Gabai et al. |
| 6,954,659 | B2 | 10/2005 | Tushinsky et al. |
| 7,003,588 | B1 | 2/2006 | Takeda et al. |
| 7,154,363 | B2 | 12/2006 | Hunts |
| 7,316,567 | B2 | 1/2008 | Hsieh et al. |
| 7,371,177 | B2 | 5/2008 | Ellis et al. |
| 7,641,476 | B2 | 1/2010 | Didur et al. |
| 7,695,338 | B2 | 4/2010 | Dooley et al. |
| 8,079,846 | B1 | 12/2011 | Cookson |
| 8,087,939 | B2 | 1/2012 | Rohrbach et al. |
| 8,257,157 | B2 | 9/2012 | Polchin |
| 8,317,566 | B2 | 11/2012 | Ganz |
| 8,475,275 | B2 | 7/2013 | Weston et al. |
| 8,548,819 | B2 | 10/2013 | Chan et al. |
| 8,753,163 | B2 | 6/2014 | Gaute |
| 8,753,164 | B2 | 6/2014 | Hansen et al. |
| 8,932,123 | B2 | 1/2015 | Murayama et al. |
| 9,555,326 | B2 | 1/2017 | Scott et al. |
| 9,597,607 | B2 | 3/2017 | Bdeir |
| 9,703,896 | B2 | 7/2017 | Zhang et al. |
| 2001/0049249 | A1 | 12/2001 | Tachau et al. |
| 2002/0196250 | A1 | 12/2002 | Anderson et al. |
| 2003/0026090 | A1 | 2/2003 | Bornovski |
| 2004/0110557 | A1 | 6/2004 | Rowe |
| 2004/0215958 | A1 | 10/2004 | Ellis et al. |
| 2005/0059483 | A1 | 3/2005 | Borge |
| 2005/0132290 | A1 | 6/2005 | Buchner et al. |
| 2007/0072680 | A1 | 3/2007 | Ikeda |
| 2007/0097832 | A1 | 5/2007 | Koivisto et al. |
| 2007/0184722 | A1 | 8/2007 | Doherty |
| 2007/0191100 | A1 | 8/2007 | Counts |
| 2007/0198117 | A1 | 8/2007 | Wajihuddin |
| 2007/0211047 | A1 | 9/2007 | Doan et al. |
| 2008/0009348 | A1 | 1/2008 | Zalewski et al. |
| 2008/0294763 | A1 | 11/2008 | Uchida |
| 2009/0029771 | A1 | 1/2009 | Donahue |
| 2009/0081923 | A1 | 3/2009 | Dooley et al. |
| 2009/0197658 | A1 | 8/2009 | Polchin |
| 2009/0291764 | A1 | 11/2009 | Kirkman et al. |
| 2009/0307592 | A1 | 12/2009 | Kalanithi et al. |
| 2010/0007528 | A1 | 1/2010 | Urata et al. |
| 2010/0026458 | A1 | 2/2010 | Samdahl et al. |
| 2010/0052916 | A1 | 3/2010 | Canora et al. |
| 2010/0144429 | A1 | 6/2010 | Ryan et al. |
| 2010/0167623 | A1 | 7/2010 | Eyzaguirre et al. |
| 2011/0021109 | A1 | 1/2011 | Le et al. |
| 2012/0050198 | A1 | 3/2012 | Cannon |
| 2012/0122059 | A1 | 5/2012 | Schweikardt et al. |
| 2012/0286629 | A1 | 11/2012 | Johnson et al. |
| 2013/0109267 | A1 | 5/2013 | Schweikardt et al. |
| 2013/0109272 | A1 | 5/2013 | Rindlisbacher |
| 2013/0122753 | A1 | 5/2013 | Blakborn |
| 2013/0165223 | A1 | 6/2013 | Leyland et al. |
| 2013/0173658 | A1* | 7/2013 | Adelman ........... G06K 19/0723 707/769 |
| 2013/0196770 | A1 | 8/2013 | Barney et al. |
| 2013/0288563 | A1 | 10/2013 | Zheng et al. |
| 2014/0030955 | A1 | 1/2014 | Smetanin et al. |
| 2014/0244018 | A1 | 8/2014 | Bach et al. |
| 2015/0004871 | A1 | 1/2015 | Laursen |
| 2015/0104774 | A1 | 4/2015 | Watry et al. |
| 2015/0127146 | A1 | 5/2015 | Carlson et al. |
| 2015/0258434 | A1 | 9/2015 | Scott et al. |
| 2015/0258435 | A1 | 9/2015 | Zhang et al. |
| 2015/0258440 | A1 | 9/2015 | Zhang et al. |
| 2017/0308624 | A1 | 10/2017 | Zhang et al. |

FOREIGN PATENT DOCUMENTS

| | | |
|---|---|---|
| EP | 1271415 A1 | 1/2003 |
| EP | 1291138 A2 | 3/2003 |
| EP | 1883194 A1 | 1/2008 |
| EP | 2311539 A2 | 4/2011 |
| WO | 2001012285 A1 | 2/2001 |
| WO | 2001069799 A2 | 9/2001 |
| WO | 2001069829 A2 | 9/2001 |
| WO | 2005083546 A1 | 9/2005 |
| WO | 2009037679 A1 | 3/2009 |
| WO | 2012160055 A1 | 11/2012 |

OTHER PUBLICATIONS

"Skylanders Swapforce", Sep. 11, 2013, Available at: http://www.skylanders.com/swapforce.

"Disney Infinity", Nov. 19, 2013, Available at: https://infinity.disney.com/en-gb.

"Cubelets", Sep. 11, 2013, Available at: http://www.modrobotics.com/.

"Shapeways", Nov. 19, 2013, Available at: http://shapeways.com/.

Lampe, et al., "The Augmented Knight's Castle—Integrating Mobile and Pervasive Computing Technologies into Traditional Toy Environments", Nov. 21, 2013, Available at: http://www.vs.inf.ethz.ch/publ/papers/mlampe-pg07-akc.pdf.

Kikin-Gil, Ruth, "BuddyBeads", Published on: Oct. 10, 2006, Available at: http://www.ruthkikin.com/Images/r.rikin-gil_thesis2005.pdf.

Fortmann, et al., "Illumee: Aesthetic Light Bracelet as a Wearable Information Display for Everyday Life", In Proceedings of ACM Conference on Pervasive and Ubiquitous Computing Adjunct Publication, Sep. 8, 2013, 4 pages.

Labrune, et al., "Telebeads: Social Network Mnemonics for Teenagers", In Proceedings of Conference on Interaction Design and Children, Jun. 7, 2006, 8 pages.

Ahde, et al., "Hello—Bracelets Communicating Nearby Presence of Friends", In Proceedings of the Tenth Anniversary Conference on Participatory Design, Sep. 30, 2008, 3 pages.

Kuniavsky, Mike, "Smart Things: Ubiquitous Computing User Experience Design", Published on: Sep. 2010, Available at: http://books.google.co.in/books?id=-WLyUCBBUVAC&pg=PA89&lpg=PA89&dq=Interactive+Smart+Beads+and+Bracelet&source=bl&ots=HA6ZA1Bssz&sig=x1s2X1pGZIe-5oVqX3uZA0jZ1ks&hl=en&sa=X&ei=BxWLUqSGI4X3rQfh9oDYCg&ved=0CFAQ6AEwBg#v=onepage&q=Interactive%20Smart%20Beads%20and%20Bracelet&f=false.

Robertson, Judy, "Encouraging Girls to Study Geeky Subjects (Part 2): Programmable Bracelets", Published on: Apr. 12, 2010, Available at: http://cacm.acm.org/blogs/blog-cacm/85132-encouraging-girls-to-study-geeky-subjects-part-2-programmable-bracelets/fulltext.

Lampe, et al., "Integrating Interactive Learning Experiences into Augmented Toy Environments", In Proceedings of the Pervasive Learning Workshop at the Pervasive Conference, May 2007, 8 pages.

"Seebo Platform", Published on: Jun. 22, 2013, Available at: http://www.seebo.com/.

Raffle, et al., "Topobo: A Constructive Assembly System with Kinetic Memory", In Proceedings of the SIGCHI Conference on Human Factors in Computing Systems, Apr. 24, 2004.

Schmid, et al., "Networking Smart Toys with Wireless ToyBridge and ToyTalk", In IEEE International Conference on Computer Communications, Apr. 10, 2011, 2 pages.

Patrizia, et al., "A Robotic Toy for Children with special needs: From requirements to Design", In IEEE 11th International Conference on Rehabilitation Robotics, Nov. 20, 2013, 6 pages.

(56) References Cited

OTHER PUBLICATIONS

Zaino, Jennifer, "JNFC Technology Brings New Life to Games", In Journal of RFID, Oct. 1, 2012, 10 pages.

"The NEX band", Jan. 3, 2014, Available at: http://www.mightycast.com.

Gilpin, et al., "Robot pebbles: One centimeter modules for programmable matter through self-disassembly", In Proceedings of IEEE International Conference on Robotics and Automation (ICRA), May 3, 2010, 8 Pages.

"International Search Report and Written Opinion Issued in PCT Patent Application No. PCT/US2015/018561", dated May 20, 2015, 10 Pages.

"International Preliminary Report on Patentability Issued in PCT Application No. PCT/US2015/018561," dated Mar. 10, 2016, 8 Pages.

"Second Written Opinion Issued in PCT Application No. PCT/US2015/018561," dated Dec. 14, 2015, 6 Pages.

"Final Office Action Issued in U.S. Appl. No. 14/203,991", dated Mar. 4, 2016, 5 Pages.

"Non Final Office Action Issued in U.S. Appl. No. 14/203,991", dated Aug. 16, 2016, 6 Pages.

"Non Final Office Action Issued in U.S. Appl. No. 14/203,991", dated Sep. 29, 2015, 11 Pages.

"Notice of Allowance Issued in U.S. Appl. No. 14/203,991", dated Mar. 6, 2017, 7 Pages.

"Non-Final Office Action Issued in U.S. Appl. No. 14/204,239", dated Mar. 21, 2016, 10 Pages.

"Notice of Allowance Issued in U.S. Appl. No. 14/204,239", dated Sep. 12, 2016, 8 Pages.

"Final Office Action Issued in U.S. Appl. No. 14/204,740", dated May 11, 2017, 14 Pages.

"Non Final Office Action Issued in U.S. Appl. No. 14/204,740", dated Oct. 6, 2016, 12 Pages.

"Non Final Office Action Issued in U.S. Appl. No. 14/204,740", dated Mar. 22, 2018, 17 Pages.

"Non-Final Office Action Issued in U.S. Appl. No. 14/205,077", dated Oct. 29, 2015, 11 Pages.

"Notice of Allowance Issued in U.S. Appl. No. 14/205,077", dated Jun. 28, 2016, 7 Pages.

"Notice of Allowance Issued in U.S. Appl. No. 14/205,077", dated Oct. 31, 2016, 7 Pages.

"Office Action Issued in European Patent Application No. 15716200.9", dated Jan. 3, 2018, 4 Pages.

"Supplementary Search Report Issued in European Patent Application No. 15762353.9", dated Oct. 6, 2017, 7 Pages.

Gorbet, et al., "Triangles: Tangible Interface for Manipulation and Exploration of Digital Information Topography", In Proceedings of the SIGCHI Conference on Human Factors in Computing Systems, Jan. 1, 1998, pp. 49-56.

"International Search Report and Written Opinion Issued in PCT Application No. PCT/US2015/018560", dated May 20, 2015, 11 Pages.

"International Preliminary Report on Patentability Issued in PCT Application No. PCT/US2015/018562", dated Jun. 13, 2016, 6 Pages.

"International Search Report & Written Opinion Issued in PCT Application No. PCT/US2015/018562", dated Sep. 2, 2015, 12 Pages.

"Second Written Opinion Issued in PCT Application No. PCT/US2015/018562", dated Mar. 22, 2016, 5 Pages.

"International Preliminary Report on Patentability Issued in PCT Application No. PCT/US2015/019341", dated Apr. 26, 2016, 07 Pages.

"International Search Report and Written Opinion Issued in PCT Application No. PCT/US2015/019341", dated Jun. 15, 2015, 11 Pages.

"Second Written Opinion Issued in PCT Application No. PCT/US2015/019341", dated Jan. 26, 2016, 6 Pages.

"Office Action Issued in U.S. Appl. No. 15/453,375", dated Nov. 8, 2017, 8 Pages.

"Office Action Issued in Chinese Patent Application No. 201580013171.0", dated Apr. 4, 2018, 7 Pages.

"Office Action Issued in European Patent Application No. 15718279", dated Jun. 13, 2018, 5 Pages.

"Non Final Office Action Issued in U.S. Appl. No. 15/646,004", dated Jun. 22, 2018, 12 Pages.

"Office Action Issued in Chinese Patent Application No. 201580013167.4", dated Aug. 28, 2018, 20 Pages.

\* cited by examiner

INTERACTIVE SMART BEADS

BACKGROUND

There are many ways that a user can interact with a computer game and typically a user controls the game via a keyboard and mouse, games controller (which may be handheld or detect body movement) or touch screen, dependent upon the platform on which the game is being played (e.g. computer, games console or handheld device). A number of games have also been developed in which gameplay is enabled (or unlocked) through the use of physical character toys which are placed on a custom base connected to a games console. By placing different toys on the custom base, different gameplay is enabled.

The embodiments described below are not limited to implementations which solve any or all of the disadvantages of known methods of interacting with software.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Interactive smart beads are described. The beads are attached to a connecting element and form an interactive item of manufacture such as a fashion item such as a necklace or bracelet. The connecting element detects the presence of beads which are part of the fashion item and also beads which are part of nearby fashion items. The connecting element also autonomously generates interactions between two or more detected beads and transmits data about the interactions to a software experience so that a user can view a graphical representation of the interactions. In various examples each bead represents a character, environment, object, etc. and the software experience displays an animated story based on the characters, environments, objects, etc. represented by the beads involved in an interaction.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
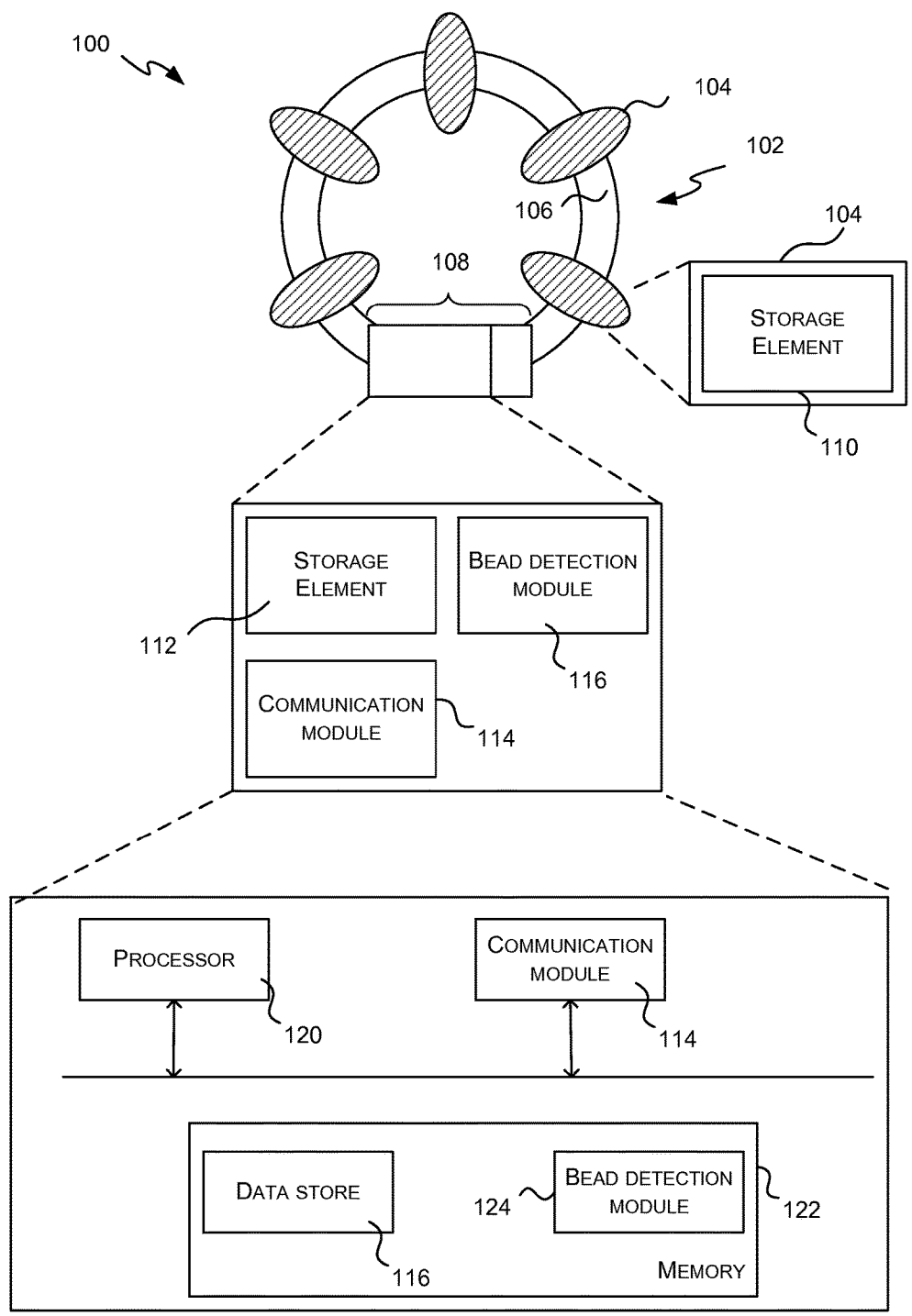
FIG. 1 is a schematic diagram of an example fashion item.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

A fashion item is described below which comprises two or more smart beads on a connecting element (e.g. a bracelet). A user (who may alternatively be referred to as a wearer) can add, remove and re-arrange the beads on the connecting element. Each smart bead is arranged to store both an ID for the bead and data relating to the bead (i.e. within a storage element in the bead). The connecting element detects which beads are on it and also detects any nearby beads on another connecting element. Furthermore, the connecting element autonomously generates interactions between beads (which may be on the same connecting element or on a nearby connecting element) and stores data about these interactions. The generation of an interaction is described herein as being autonomous as it is not triggered by explicit user input (such as pressing a button on a bead or interacting with a sensor on a bead). In various examples, as well as autonomously generating interactions, further generations may additionally be generated in response to user interaction with a bead or connecting element (such as pressing a button on a bead or interacting with a sensor on a bead).

In various examples, the connecting element communicates with a software experience running on a separate computing-based device (e.g. a smartphone, tablet, laptop, games console, desktop computer, etc.) to enable the user (e.g. the wearer of the fashion item) to engage in different software experiences regarding the past interactions and/or current state of beads. In various examples, the communication with a software experience enables the user to review past interactions between beads and/or the current state of beads, where each bead may represent a character (e.g. human, animal, etc.) or environment (e.g. a place, location, object, structure) within the software experience. In other examples, a bead may represent an object associated with (e.g. carried or owned by) a character or environment, a skill or emotion, an abstract software concept such as a "powerup" in a game experience (e.g. where the user gains virtual goods or boosts in statistics), a time, date or time period, e.g. "night time", "Valentine's day", "autumn", "birthday", an activity (e.g. swimming, running), a brand, logo or icon (e.g. Microsoft®, Skype™, Facebook™, Spotify™, Twitter™, etc.), a popular cultural reference, e.g. a TV show, actor, singer, movie, genre of music, etc. In all these cases the referred-to concept can be fictional or real, and in many cases can be general (e.g. "a forest") or specific (e.g. "Sherwood forest"). In various examples, a user may be able to configure (e.g. via the software experience) what a smart bead represents (e.g. a user may be able to program beads to be associated with different applications, different people, etc.) and/or to configure how a bead acts in response to interactions.

The review of past interactions and/or current state in the software experience (which may in various examples be an interactive software experience) may be presented to the user in graphical depictions of e.g. the characters, environments, time periods and/or objects that the beads represent. These may be animated. Animations can be used to show a storyline based on the timeline of autonomously generated interactions between beads. Furthermore, the current state and/or past interactions can be presented textually, sonically, haptically or in any other way. For example, where a connecting element comprises a bead which represents a cat character, a bead which represents a mouse character and a bead which represents a house, the software experience may display an animated story depicting the cat and the mouse in the house. In various examples, the past interactions may be presented as a social network which represents the beads (which may represent other users) that the user has been proximate to or interacted with.

The data which is communicated to the software experience may comprise the IDs for the beads on the connecting element, some or all of the data about a bead (or bead data) stored on each bead and details of the generated interactions between beads. As is described in more detail below, the bead data may comprise one or more of: details of the character/environment/emotion etc. that the bead represents (e.g. in the form of visual data and/or other code describing the character/environment for execution within the software experience, such as information describing how a character moves or behaves), state information (e.g. for the bead and/or for the software experience), the code for the entire software experience (e.g. in the form of executable files) or for a part of it, etc. In various examples, the user may be able to update the bead data (e.g. via the software experience) such that a user can influence how a bead behaves, which other beads it can interact with, etc. The connecting element may be in substantially continuous communication with the software experience (e.g. every few seconds or more frequently than this) or alternatively it may not be in constant communication with the software experience but instead may connect intermittently (e.g. when in range of the computing-based device on which the software experience is running, in response to a user input on the fashion item or in the software experience, when there is new data to transmit, etc.).

Figure 7:
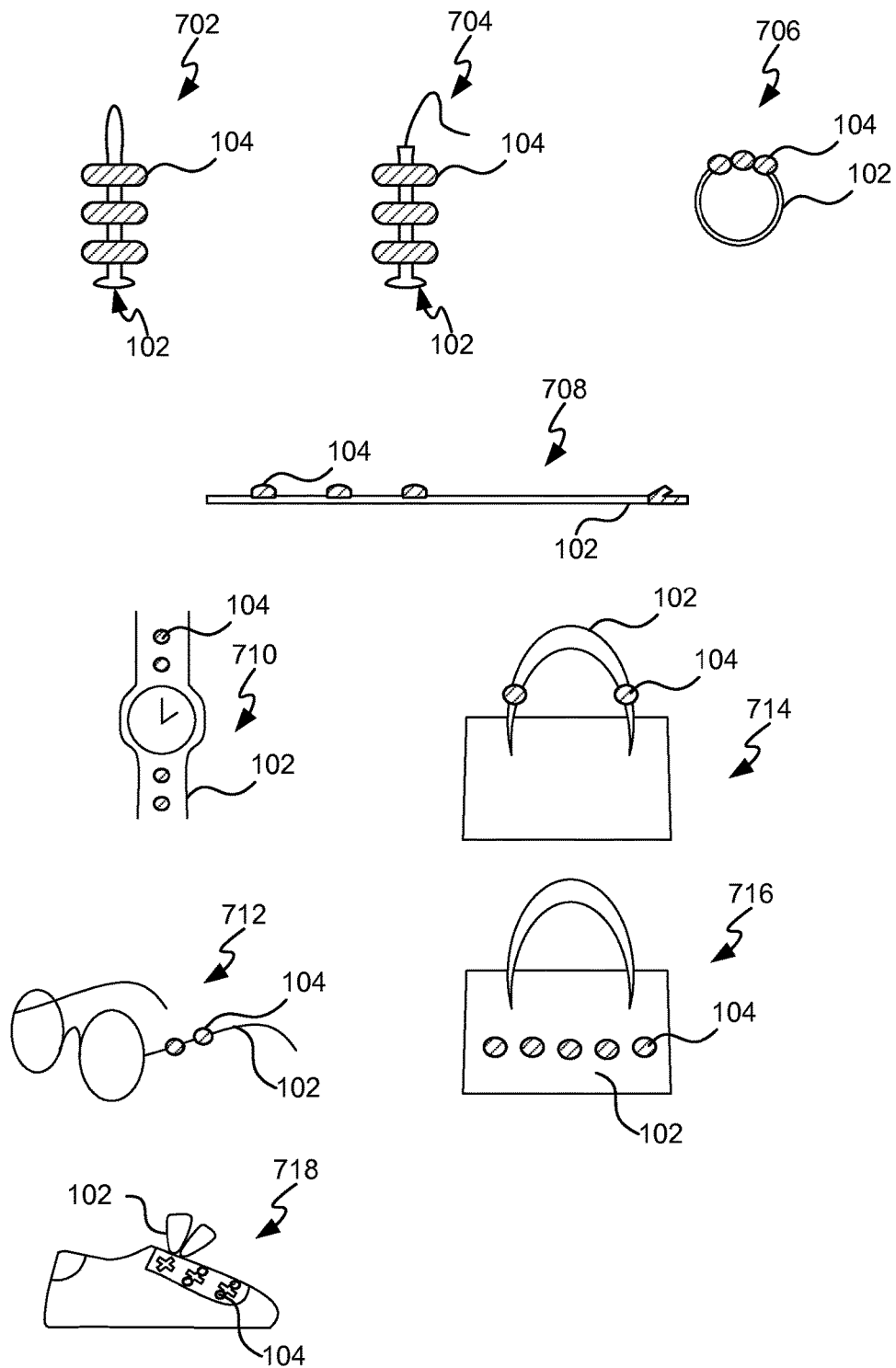
FIG. 7 comprises schematic diagrams of various other example fashion items.

FIG. 1 is a schematic diagram of a fashion item 100 (in this example a bracelet or necklace) which comprises a connecting element 102 on which two or more smart beads 104 are mounted (e.g. threaded on the connecting element in this example). The connecting element 102 in this example comprises two parts: an elongate band 106 and a clasp 108. The clasp 108 is formed from two parts which can be joined together or separated from each other so that the wearer can put the item 100 around their wrist or neck. Although FIG. 1 shows a particular form factor for the connecting element 102 (e.g. band 106 and clasp 108), it will be appreciated that in other examples, the connecting element 102 may have a different form factor (e.g. there may be no clasp and the functionality which is described below as being in the clasp may be integrated within the band). Further examples of different fashion items and form factors are shown in FIG. 7 and described below.

Each smart bead 104 comprises a storage element 110 (e.g. a memory) which is arranged to store an ID of the bead (which in some examples may be a unique ID for the bead or a unique ID for the type of bead) and bead data (e.g. details about the character or environment that the bead represents within a software experience). This bead data may comprise constant data (i.e. data which does not change over the life of the bead) and/or variable data (i.e. data which changes over the life of the bead). Further detail about what the bead data may comprise is provided below. In various examples, the storage element 110 may also be used to store other information about the bead, such as an audio or video message which can be played by the user via the software experience. In various examples a user may be able to store data in the storage element 110 (e.g. such that a user can customize the bead by inserting a photograph into a slot on the bead and storing complementary digital information in the storage element).

Figure 6:
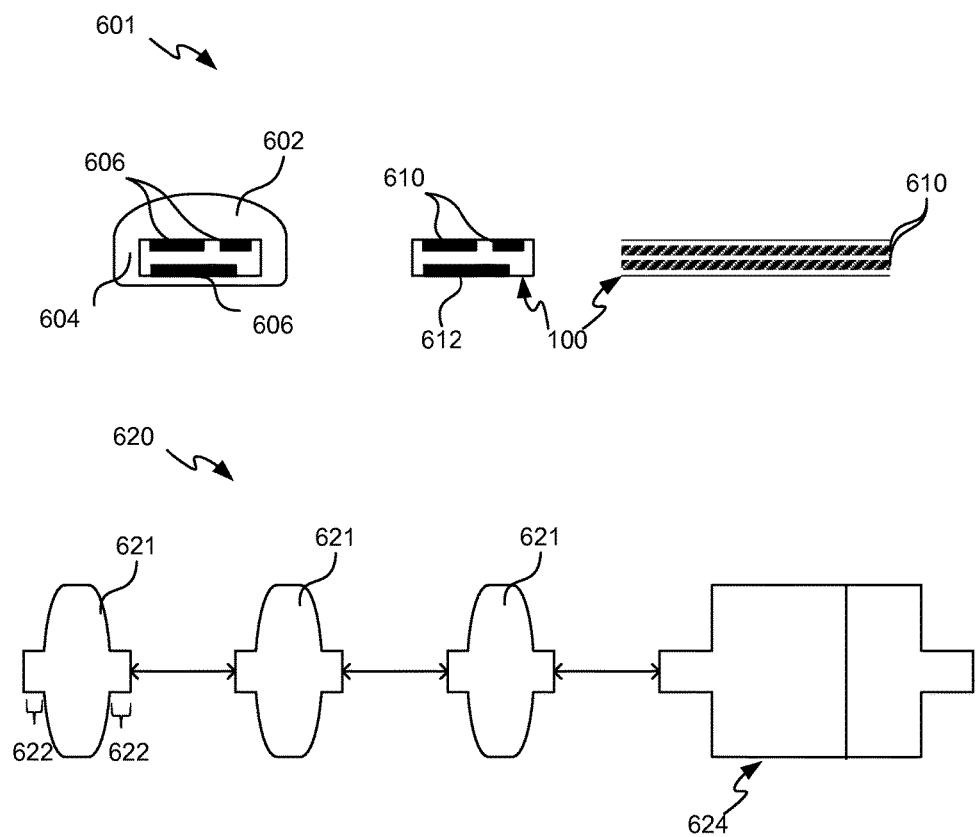
FIG. 6 shows schematic diagrams of two example arrangements of smart beads and connecting elements in more detail.

The connecting element 102 comprises a storage element 112, a communication module 114 and a bead detection module 116. The bead detection module 116 detects which beads are mounted on the connecting element 102 and also detects beads on nearby (or proximate) connecting elements. The bead detection module 116 may store details of all the detected beads (e.g. at least their bead ID) in the storage element 112. The bead detection module 116 may use any suitable technology to detect the beads on the connecting element. In various examples, there may be one or more electrical contact points between a bead and the connecting element such that there is an electric circuit comprising the bead and the connecting element (e.g. as shown in FIG. 6 and described below) and these electrical contacts (and the resultant electrical circuit) may be used to pass data (and in some examples power) between the bead and the connecting element. In other examples there may be no physical electrical contact between a bead and the connecting element and a non-contact technology such as Near Field Communication (NFC) may be used to detect the presence of beads. For example, a bead may comprise an NFC tag and the connecting element may comprise an NFC reader (e.g. the band 106 may act as an antenna for an NFC reader located in the clasp 108).

The bead detection module 116 (or a separate bead interaction module, not shown in FIG. 1) autonomously generates interactions between beads on the same or nearby connecting elements (e.g. between characters and/or environments represented by the beads in a software experience) and stores data about these interactions in the storage element 112. As described below, these interactions are subsequently displayed to the user within a software experience (e.g. to tell a story about the characters represented by the beads).

The communication module 114 enables the fashion item 100 (and in particular the connecting element 102) to communicate with a computing device running a software experience. In various examples, this software experience may be an interactive software experience, such as a game, social media application, personal organization application (e.g. which enables one or more users to set out a family/work schedule through physical tokens in the form of modules which represent particular tasks), multimedia application (e.g. which allows a user to compose photographs and music represented by physical tokens in the form of modules into a slideshow/movie for sharing), etc. In other examples, the software experience may not be interactive but may just display information to a user, e.g. in the form of a personal digital video stream, status display, "wallpaper" application e.g. used on large screens in screensaver mode, etc.

Any suitable wireless communication technology may be used by the communication module 114 to communicate with the software experience, e.g. Bluetooth®, Bluetooth® Low Energy (BLE), WiFi™ or WiFi™ Direct, NFC, 802.15.4, etc. The communication module 114 may communicate directly with the computing device running the software experience (e.g. smartphone, tablet computer, games console, etc.) or may communicate via a network (e.g. a home network or the internet) or intermediary device (e.g. a wireless access point).

In various examples, the fashion item may comprise a display and capabilities to execute the software experience locally (i.e. on the fashion item). In such examples, the fashion item may not comprise a communication module 114 but instead the generated interactions may be displayed to a user on the display in the fashion item.

The information which is communicated from the fashion item 100 to the software experience (via the communication module 114) may include the IDs of the beads 104 on the connecting element 102, some or all of the bead data stored in each of the beads on the connecting element 102 and information about the autonomously generated interactions between beads. The data that is communicated from the fashion item 100 to the software experience is therefore some or all of the data stored in the storage element 112 within the connecting element 102. In various examples, the connecting element 102 may aggregate the data prior to sending it to the software experience (e.g. to reduce the amount of data which is transmitted), e.g. such that the raw IDs of each bead are not transmitted but other information (e.g. bead set information such as "bead set A") is communicated from which the software experience can determine which beads 104 are mounted on the connecting element 102.

In examples where the storage module 110 on the bead 102 stores additional information such as an audio or video message, this may also be communicated from the fashion item 100 to the software experience (by the communication module 114) so that a user can play (e.g. view and/or hear) the message within the software experience.

The bead detection module 116 may be implemented in hardware and/or software. In various examples, the bead detection module 116 may comprise software (i.e. device-executable instructions) which is stored in a storage element (e.g. memory 122) within the connecting element 102. In such an example, the connecting element 102 comprises a processor 120 which executes the device-executable instructions of the bead detection module 116 in order to detect the beads 104 that are mounted on the connecting element 102 and in some examples also to autonomously generate interactions between the beads 104. The processor 120 may be a microprocessor, controller or any other suitable type of processor for processing computer executable instructions to implement the functionality described herein. In such an example, the data generated by the bead detection module may also be stored in the memory 122 (e.g. in data store 124).

The connecting element 102 may comprise additional elements not shown in FIG. 1. For example, the connecting element 102 may comprise a battery and provide power to the beads and this may, for example, be achieved through physical electrical connections between a bead and the connecting element or alternatively, inductive rings may be used to couple power from the connecting element into a bead. In other examples, a special power bead (comprising a battery) may provide power to the connecting element and/or other beads. Such a power bead may, in various examples, not comprise a storage element 110 and may not represent a character, environment or other object within the software experience.

It will be appreciated that the beads 104 shown in FIG. 1 may comprise additional elements not shown in FIG. 1, such as batteries, sensors, actuators, displays (e.g. LEDs), additional hardware logic, etc. In an example, a bead may comprise a user input mechanism (e.g. a dial or button). By interacting with the bead a user may change the data stored in the storage element (e.g. a value corresponding to an emotion) and this data may affect the functionality of the software experience and/or the generation of interactions (e.g. if a user indicates that they are angry, this may change the types of interactions which are generated). In examples where a bead comprises a sensor, sensor data may be stored in the storage element 110, received by the connecting element (e.g. by the bead detection module) and passed to the software experience (e.g. via the communication module 114). The sensor data may affect the functionality of the software experience and/or the generation of interactions. In examples where a bead represents an application (e.g. Microsoft® Outlook®, Facebook™, Twitter™, Spotify™, etc.) a display (e.g. an e-ink display or LED) may be used to reflect the status of the application.

The beads 104 are described as representing a character, environment, object, emotion, etc. In various examples, a bead may represent a well-known individual (e.g. a celebrity) and such a 'celebrity bead' may store information about that individual (e.g. in storage element 110) and this information may be periodically updated (e.g. by the software experience). Other beads may represent fictional characters. Similarly, the environments represented may be an environment type (e.g. beach, mountain, etc.), a real place (e.g. London, Paris, New York) or a fictional environment.

Figure 2:
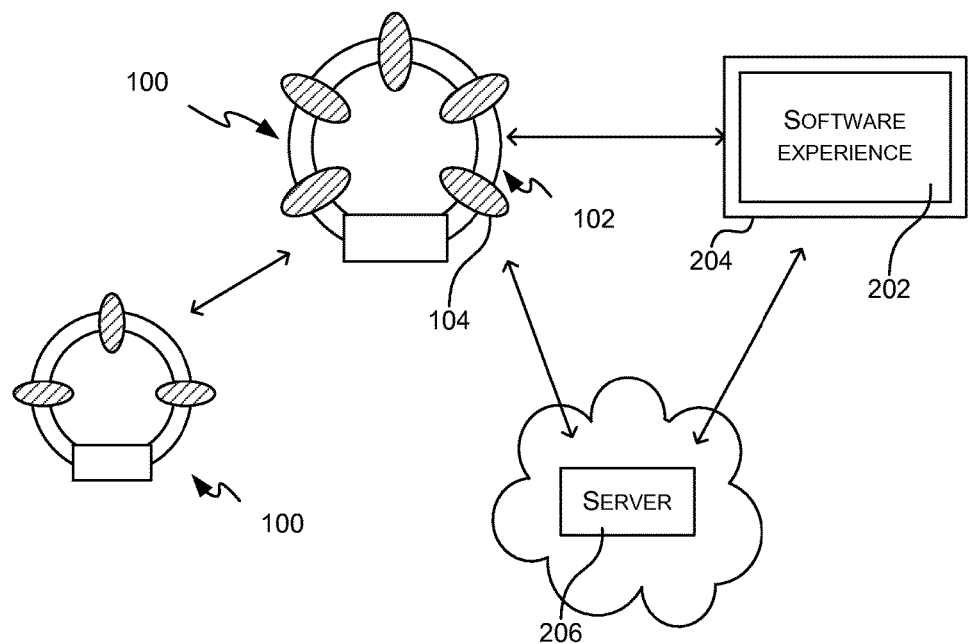
FIG. 2 is a schematic diagram of an example system comprising the fashion item from FIG. 1.
Figure 3:
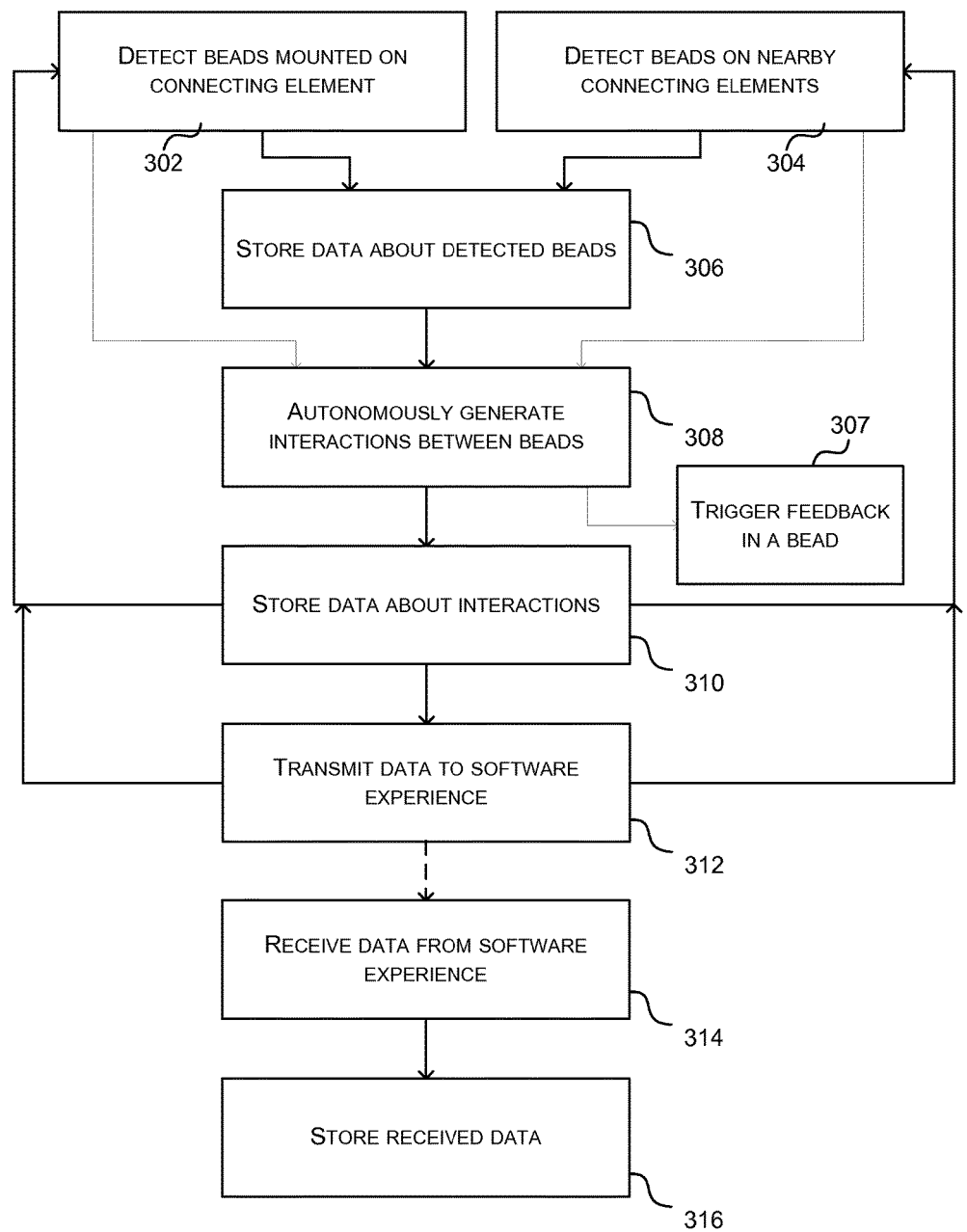
FIG. 3 is a flow diagram of an example method of operation of a connecting element.
Figure 4:
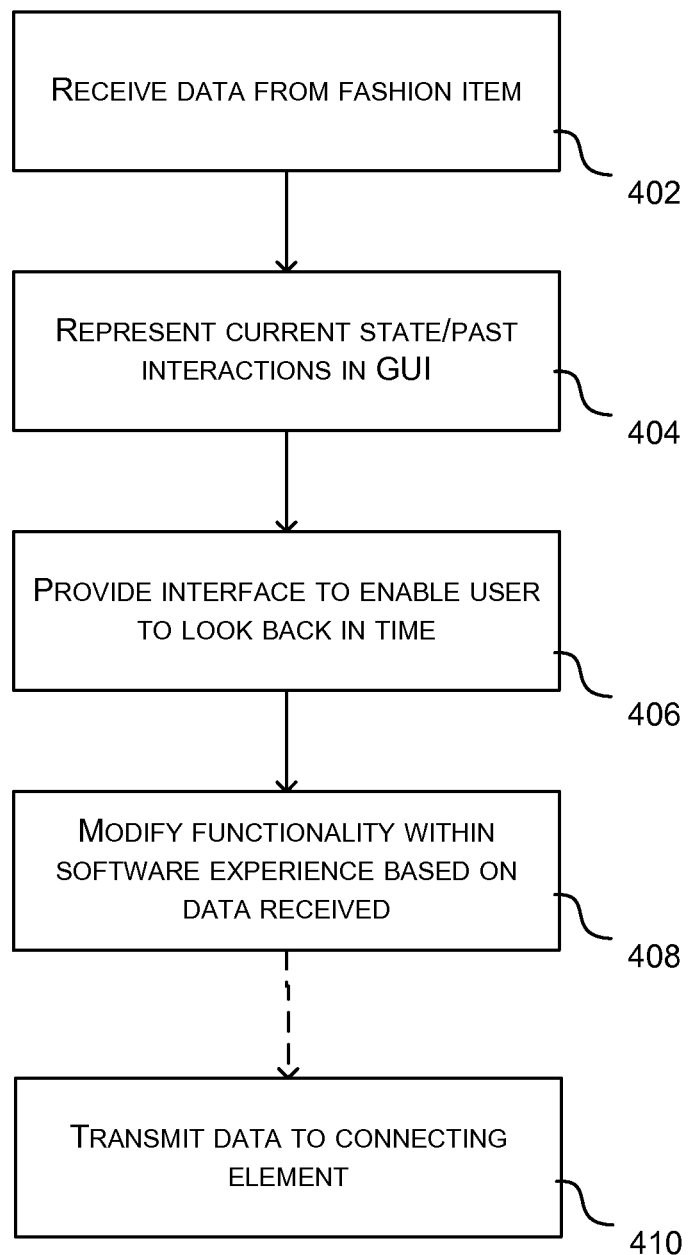
FIG. 4 is a flow diagram of an example method of operation of a software experience.

FIG. 2 is a schematic diagram of a system 200 comprising the fashion item 100 from FIG. 1. The system 200 further comprises the software experience 202 which runs on a computing-based device 204. The system 200 may further comprise a remote (e.g. cloud-based) server 206 and/or a second fashion item 100. Operation of the system 200 (and in particular a fashion item 100) can be described with reference to FIGS. 3 and 4. FIG. 3 is a flow diagram of an example method of operation of a connecting element 102 and FIG. 4 is a flow diagram of an example method of operation of a software experience 202.

As described above, the connecting element 102, detects beads that are on the connecting element (block 302), where these beads may be mounted on the connecting element, e.g. threaded onto the connecting element (as shown in FIGS. 1 and 2), attached to the connecting element (e.g. using glue or other fixing means) or otherwise connected to the connecting element. As also described above, the connecting element 102 also detects beads on any proximate connecting element (block 304). A second connecting element 102 is considered as being proximate if it is sufficiently close to the first connecting element 102 that the first connecting element 102 can detect beads on the second connecting element or can communicate with the second connecting element. The distances involved (e.g. the maximum separation of proximate connecting elements) will therefore depend upon the wireless technology, antennas, mutual orientation, and transmit signal powers used within the connecting elements, (e.g. more distant connecting elements may be considered proximate where WiFi™ is used compared to where NFC is used) and may also depend upon the environment in which the fashion items are used (e.g. as the environment may affect the range of a particular wireless technology). Data about any detected beads (from blocks 302 and 304) may be stored (block 306) where this data comprises the bead IDs and in some examples some or all of the bead data stored within a bead.

Where the connecting element detects more than one bead (in block 302 and/or 304), the connecting element 102 autonomously generates interactions between two or more of the detected beads (block 308) and stores data about these autonomous interactions (block 310). Autonomously generating interactions (in block 308) may comprising autonomously selecting two or more beads from the set of detected beads, where the two or more beads may be on the same connecting element or on proximate connecting elements at the time of the interaction (e.g. where, as described above, each bead may represent a character, environment, object, etc.). In such an example, the data that is stored for each interaction may be a timestamp and a series of bead IDs for the beads involved in the interaction, e.g. {12.00, beadA, beadB, beadC}. In other examples, the data that is stored for the interaction may comprise a characteristic of the interaction, such as an interaction type (e.g. conversation, argument, hug, battle, etc.) and in various examples an outcome of the interaction (e.g. beadA won and/or beadB lost). Where this additional detail about an interaction (e.g. interaction type, outcome, etc.) is not generated by the connecting element at the time the interaction is created, it may be generated subsequently by the connecting element or it may be generated by the software experience. Furthermore details about other context may be stored, e.g. the location of the interaction, and the identities of other beads or connecting elements that were around, or the number or identity of other devices or users (e.g. via their device MAC addresses). This may be used as part of the autonomous generation, e.g. to add details of the "audience" for the interaction, or the environment in which it took place.

Where an outcome is generated, this may be generated based on the bead data stored within each bead (e.g. a bead with a higher strength score, as recorded within the bead data, may win a battle). Furthermore, the interaction may cause the bead data within a bead to be updated, as described in more detail below.

The bead data within each of the interacting beads may be used to determine which beads autonomously interact (e.g. a bead may store a 'friends list' and only interact with beads on that list and/or environment beads may only interact with character beads and not with other environment beads, etc.) and/or the type of any interaction (e.g. there may be a friendly interaction between beads on a friends list and a more hostile interaction between beads that are not on a friends list). In various examples, beads may belong to particular sets and beads may only interact with beads within the same set.

Where the beads involved in an autonomous interaction (generated in block 308) comprise a feedback mechanism, such as a display (e.g. one or more LEDs or a small LCD or e-ink display) or an actuator (e.g. generating a movement such as vibration or rotation), the connecting element 102 may send a trigger signal to one or more of the beads involved in the interaction to provide feedback to the user (block 307). For example, where a bead comprises an LED, the LED may flash (as triggered by the connecting element in block 307) when the bead is involved in an autonomous interaction. Alternatively, where the bead comprises a vibrating mechanism, the connecting element may trigger it to vibrate when the bead is involved in an autonomous interaction. Where a bead is located on a proximate connecting element, the connecting element may send a trigger signal to the proximate connecting element to trigger generation of feedback in the bead on the proximate connecting element. This provision of feedback to a user at the time of generation of the interaction enhances the user experience.

Data about the autonomous interactions is stored by the connecting element (block 310). The data which is stored may comprise a self-contained entry for each interaction (e.g. such that an entry about an interaction comprises all the information required by the software experience to represent the interaction within a GUI) or an entry for an interaction may refer to data stored about the beads (in block 306).

The connecting element 102 transmits data about the detected beads and generated interactions to the software experience (block 312), which as described above may run on a separate computing device or in various examples, on the connecting element itself. As described above, where the software experience runs on a separate computing device, in some examples the connecting element may be in constant communication with the software experience and in other examples the connecting element is not in constant communication with the software experience but instead may connect intermittently (e.g. when in range of the computing-based device on which the software experience is running, in response to a user input on the fashion item or in the software experience, when there is new data to transmit, etc.).

As indicated in FIG. 3, the method is repeated such that data may be stored about any beads that a user adds to the connecting element and stored data is also updated (in block 306) if beads are removed from the connecting element. This may, for example, comprise deleting stored data relating to beads which are no longer on the connecting element; however data is not deleted where it is referred to by an entry for an interaction, but may instead be flagged as relating to a bead that is no longer present. Data may also be stored about new beads that are detected on a proximate connecting element (e.g. a new connecting element that moves into proximity with the first connecting element or a new bead added to an already proximate connecting element). In various examples, data entries about beads may comprise time stamps to indicate the time that they were added to a fashion item and the time that they were removed from the fashion item. Similarly, for beads on a proximate connecting element, the data entries may comprise time stamps indicating the start and end of periods where they were in proximity.

In various examples, the data that is transmitted to the software experience (in block 312) may notify the software experience of the current set of beads on the connecting element as well as providing details of any interactions that have not already been transmitted to the software experience. In other examples, the data which is transmitted may only relate to newly generated interactions and to changes in the set of beads on the connecting element (e.g. any new beads added and any beads removed).

As shown in FIG. 4, the software experience 202 receives the data from the fashion item 100 (block 402) and represents the current state and/or past interactions (based on the data about generated interactions received in block 402) within a GUI (block 404). As described above, the data received about an interaction may include detail about the interaction (e.g. interaction type, outcome, etc.) or this detail may be generated by the software experience based on the data received (which may at a minimum comprise a set of bead IDs). Where the data received comprises only bead IDs and not any bead data about the beads identified (e.g. what the beads represent), the software experience may use locally stored data about the beads (e.g. stored within the software experience and indexed by bead ID) or may access remotely stored data about the identified beads (e.g. from remote server 206 shown in FIG. 2).

In various examples, the remote server 206 may store a plurality of data records, each data record relating to a bead and comprising the ID of the bead, one or more properties of the bead and optionally an identifier for the owner or manufacturer of the bead. One or more of these fields (e.g. bead ID and/or owner ID) may be verified by an authentication service which provides a method of securely verifying properties about a field's value (e.g. that the owner is correct, that the bead ID has been issued to the bead by a trusted party and is therefore not counterfeit, etc.).

The properties field(s) within a data record may comprise any property of the bead to which the record relates (as identified by the bead ID). Examples of properties include, but are not limited to: any aspect of the bead data described herein, GPS location data for the bead (e.g. a "home" location and/or a current location), statistics for the bead (e.g. length of time in use, etc.), virtual objects associated with the bead (e.g. where these objects have been collected within an interactive software experience), permissions associated with the bead (e.g. which fields within the data record can be changed and by whom and in various examples the permissions may be dependent upon the use of the bead) and references to a secondary (or further) database (e.g. which may contain additional information about, for example, the owner of the bead, as identified by the owner ID). It will be appreciated that where the properties field comprises sensitive user data, consent may be collected from the user to store and release this data.

Figure 5:
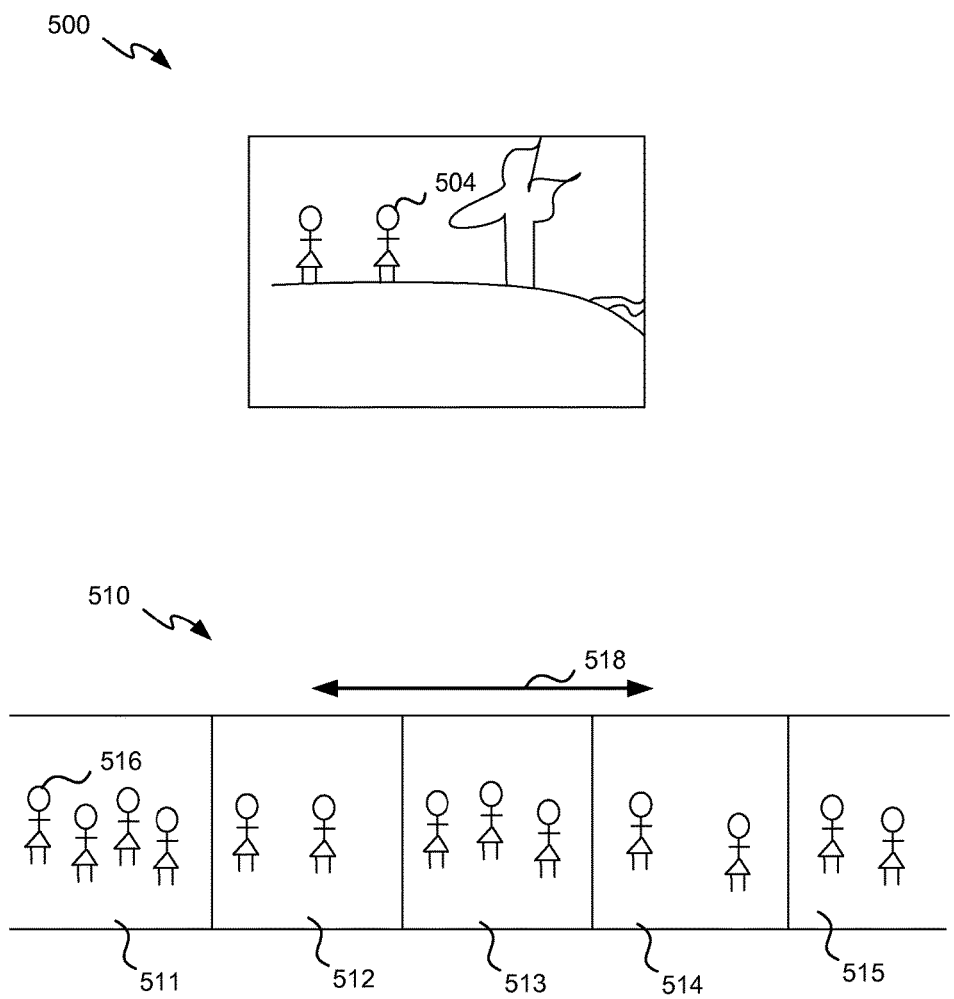
FIG. 5 shows an example representation of a current state of a fashion item and a filmstrip representation of a series of autonomously generated interactions.

FIG. 5 shows an example graphical representation 500 of a current state of a fashion item 100 which comprises three beads—one which represents a beach environment and two which represent characters 502, 504. This representation may be a still image or may be an animated sequence.

As well as representing the generated interactions and/or current state within the GUI (in block 404), the software experience 202 may also provide an interface to enable the user to scroll through time to view the interactions between beads (block 406) and this is shown in the second example in FIG. 5 which shows a filmstrip representation 510 of a series of interactions 511-515, where each interaction may be represented as a still image or an animated sequence. As described above, each bead may represent a character or an environment (although there may be beads which represent something other than a character or an environment, such as an object belonging to a character, a skill, an emotion, etc.); however in the second example in FIG. 5 only characters are shown. The first interaction 511 relates to 4 beads (each representing a character) and so the corresponding 4 characters 516 are depicted; the second interaction 512 relates to 2 beads and so the corresponding 2 characters are depicted, etc. As indicated by arrow 518 a user may scroll to view different interactions (moving backwards and forwards in time) and/or may select a particular interaction to view. The last item in the filmstrip may, for example, be a representation of the current state of the fashion item.

In various examples, the functionality within the software experience may be modified based on the data received from the fashion item 100 (block 408). For example, functionality within the software experience may be enabled, disabled and/or modified based on which beads are currently located on a connecting element and/or a proximate connecting element (e.g. as determined based on data received in block 402). For example, particular levels or mini-games within an interactive software experience (such as a game) may be unlocked by the presence of a particular bead on a connecting element. In another example, a particular character may only be available within a game if the corresponding bead is on a connecting element. In a further example, a specific type or number of past interactions may be used to unlock game content, e.g. only if one's virtual elf character (represented by an elf bead) has met a virtual orc (represented by an orc bead on a proximate connecting element or alternatively on the same connecting element).

In the description of FIGS. 3 and 4 above, data is transmitted from the fashion item 100 to the software experience 202. In various examples, however, data may also be transmitted back from the software experience 202 to the fashion item 100 and this data may, for example, comprise updated state data for a bead based on user interaction with the software experience. As shown in FIG. 4, the software experience may transmit data to a connecting element (block 410) and in response to receiving this data at the connecting element (block 314), the data may be stored in the storage element 112 in the connecting element (block 316). In addition, or instead, the data received may be stored in the storage element 110 in a bead (in block 316) and this provides one example where the connecting element may update the data stored within a bead. In another example, a connecting element may update the data stored within a bead based on one or more autonomous interactions (as generated in block 308), e.g. to update state data (such as skill points, strength values, etc.) within the bead data. In a further example, a connecting element may update the data stored within a bead in order to effect the exchange of data between the bead and a bead on a proximate connecting element; however in other examples, the data may only be exchanged between connecting elements and not between beads.

Although FIG. 2 shows a single computing device 204, single server 206, single software experience 202 and two fashion items 100, it will be appreciated that a system may comprise more than one computing device 204 and/or software experience, may comprise more than one server 206 (or may not comprise a server at all) and may comprise one or more fashion items 100.

The beads 104 shown in FIGS. 1 and 2 are depicted as all having a similar form factor (e.g. a similar external shape and appearance). However, it will be appreciated that a bead may have any shape or appearance as long as it can be mounted on or attached to the connecting element (e.g. as long as it can be threaded on the band 106 in the example shown in FIG. 1) and an example of another form factor is shown in FIG. 6 and described below. In various examples, different beads 104 (which may be attached to the same connecting element 102) may have different shapes, sizes, colors, textures etc. and the appearance of a bead may be related to the character/environment/object which it represents (e.g. a bead representing a tiger character may be striped in black and orange).

In various examples, a user may design custom beads and a service may be provided (e.g. by the software experience 202 or server 206) to generate custom beads based on a virtual 3D shape generated by a user. In an example, to generate a custom (i.e. non-standard) bead, a virtual 3D shape for the custom bead is received by a bead generation service. The service converts the received shape into a derived 3D shape for the bead, for example, ensuring that the bead is shaped such that it is compatible with the connecting element (e.g. so that it can be attached to the connecting element) and/or adding an aperture for receiving a connector and/or electronics core. Once generated, the derived 3D shape is sent to the user in physical form or virtual form. A virtual representation of the bead, or other information about the custom bead, may be provided to the software experience.

In the above description, the connecting element 102 is described as detecting the presence of beads on the connecting element and the presence of beads on a proximate connecting element. In various examples, however, the connecting element may also detect the location and/or arrangement (e.g. order) of beads on the connecting element or a proximate connecting element. For example, a connecting element may detect that beads A, B, C, D, E are present on the connecting element in the order A, C, D, B, E. In another example, a connecting element may detect that bead A is in position 1, bead B in position 2, bead C in position 3 and bead B in position 4 on the connecting element.

Where the beads are connected to a common electrical bus, the order of the beads may be detected by systematically dissecting the bus. For example, each bead (e.g. within a connecting region 622 in the second arrangement shown in FIG. 6), or the connecting element may comprise hardware logic (such as an electronic switch) to enable a processor within the connecting element to dissect the bus (i.e. the electrical connections connecting all the beads) programmatically. In various examples, the bus may comprise a 2-wire bus comprising a data line and ground. Hardware logic within each bead may connect between the two lines and a protocol such as the 1-Wire™ system may be used by the connecting element to communicate with each of the beads. In order that the connecting element can dissect the bus programmatically, each bead (or the connecting element itself) comprises hardware logic which can be controlled by the connecting element and used to dissect the bus (e.g. by breaking the connectivity of the data line).

When the connecting element requires the beads to be "threaded" on, the order of detection of the beads may be used to infer their order on the bus (e.g. detection of bead A, then bead B, then bead C indicates an order of beads of A, B, C), or a mechanism may be used to sense addition or removal of a bead which triggers sensing of the added or removed bead. The position sensing can also be done by relying on a separate device to assist, which is not necessarily carried for normal operation, e.g. by working with a separate device using computer vision techniques (based on normal images or images with depth data) to identify the bead ordering/location.

FIG. 6 shows schematic diagrams of two example arrangements of smart beads and connecting elements in more detail. The first example 601 shows a smart bead 602 which has a hole (or aperture) 604 in it which is shaped so that the bead can slide onto the connecting element 608 (which is shown in cross-section on the left and in plan view on the right). In this example, electrical contacts 606 on the internal face of the bead make contact with electrical contacts 610, 612 on the connecting element. In this example, two contacts 610 are on an upper face of the connecting element (which is formed from a long strip of a flexible material, such as rubber) and one contact 612 is on the lower face of the connecting element. In this example, the connecting element 608 detects the presence of the beads 602 via the electrical contacts 606, 610, 612 and these contacts may also be used to pass data (e.g. a bead ID) and/or power between a bead and the connecting element.

In the second example 620 shown in FIG. 6, each bead 621 comprises a connecting region 622 which connects to an adjacent bead 621 or to the connecting element 624 (which in this example forms a joining piece or clasp similar to that shown in FIG. 1 and described above). In such an example, the connecting regions 622 of each bead 621 may provide an electrical connection to the connecting element (e.g. to connect each bead in series or to connect each bead to an electrical bus) and this may be used to detect the presence (and in some examples, order) of the beads. As described above, any electrical connection between a bead and the connecting element may also be used to pass data (e.g. a bead ID) and/or power between a bead and the connecting element.

Although the present examples are described and illustrated herein as being implemented in a fashion item such as a bracelet or necklace as shown in FIG. 1, the system described is provided as an example and not a limitation. As those skilled in the art will appreciate, the present examples are suitable for application in a variety of different types of fashion items which may be wearable items (e.g. items of jewelry) or non-wearable items (e.g. a phone charm) and various other examples are shown in FIG. 7. As shown in FIG. 7 the connecting element and smart beads may be used for other fashion items such as phone charms 702, earrings 704, rings or hairbands 706, belts 708, watches 710, purses or bags 714, 716 (where the beads may, for example, be on the strap or the body of the item), glasses 712 and shoe accessories 718. Further examples include, but are not limited to, brooches, other hair accessories, other phone accessories, masks, hats, scarves, keychains and other items of clothing. The fashion items may be fabricated from any material and may also be dual-function, for example, such that they are both a fashion item and a toy or a fashion item and a gaming experience.

Various examples of the types of bead data which may be stored in a bead have been described above. Further examples of bead data which may be stored in a bead include are detailed below. Examples of constant data include, but are not limited to:

Game data, such as:
    a 2D/3D representation of the bead which can be used within a graphical user interface (GUI) of an interactive software experience to represent the bead (e.g. a 3D model, image and/or texture map)
    audio snippets or text associated with that bead
    a mini-game which is enabled within an interactive software experience as a result of using the bead or a particular combination (e.g. set) of beads Configuration data, such as:
    Manufacture date
    Manufacturer
    Bead type
    Details of any sets of beads that the bead may belong to Examples of variable data include, but are not limited to:

State data

Details of the owner of the bead, which may comprise only the current owner or details of the ownership history Permissions granted by the owner, e.g. permissions for their "friends" using a social network (e.g. Xbox LIVE®) to borrow the bead A price associated with the bead, e.g. a "for sale" price that a friend can pay to buy the bead (which may be expressed in real currencies or virtual currencies/points systems), or past history of prices/transactions involving that bead Where/when/from whom the bead was bought or how it was acquired (e.g. won as a prize in a game competition)—this is variable data as it is not fixed at the point of manufacture, but may be fixed later on.

It will also be appreciated that some of the items listed as constant data may alternatively be variable data and vice versa.

Examples of state data include:
a total real world time in use or number of total uses
recent history of use
physical state information for the bead (e.g. physical failure states such as an indicator that a sensor has failed or a rotating arm cannot rotate, battery levels, etc.)
details of use with other beads (e.g. IDs of other beads that it has been used with, details of sets of beads which have been used together with the bead, etc.)
details of the other beads with which the bead has interacted
details of where in the world the bead has been used, and of other beads that were also present in such locations (and other users that were present)

Figure 8:
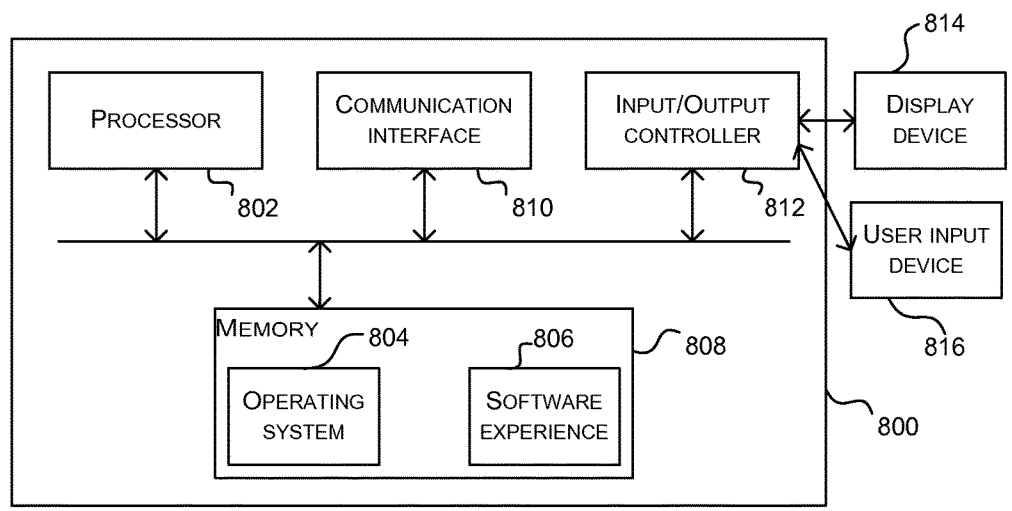
FIG. 8 illustrates an exemplary computing-based device in which embodiments of the methods described herein may be implemented.

FIG. 8 illustrates various components of an exemplary computing-based device 800 which may be implemented as any form of a computing and/or electronic device, and on which the software experience 806 may run. As described above, in various examples, the software experience may be stored in and uploaded from one or more smart beads.

Computing-based device 800 comprises one or more processors 802 which may be microprocessors, controllers or any other suitable type of processors for processing computer executable instructions to control the operation of the device in order to run the software experience. In some examples, for example where a system on a chip architecture is used, the processors 802 may include one or more fixed function blocks (also referred to as accelerators) which implement a part of the functionality in hardware (rather than software or firmware). Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

Platform software comprising an operating system 804 or any other suitable platform software may be provided at the computing-based device to enable application software, such as the software experience 806 to be executed on the device.

The computer executable instructions may be provided using any computer-readable media that is accessible by computing based device 800. Computer-readable media may include, for example, computer storage media such as memory 408 and communications media. Computer storage media, such as memory 808, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 808) is shown within the computing-based device 400 it will be appreciated that the storage may be distributed or located remotely and accessed via a network or other communication link (e.g. using communication interface 810).

The communication interface 810 enables the computing-based device 800 to communicate with a fashion item 100 (and in particular a connecting element within the fashion item). Where the computing-based device 800 communicates directly with a connecting element, the communication interface 810 comprises a wireless interface. In other examples, where the computing-based device 800 communicates with a module via a network or intermediary device, the communication interface may use wired or wireless technology.

The computing-based device 800 also comprises an input/output controller 812 arranged to output display information to a display device 814 which may be separate from or integral to the computing-based device 800. The display d may provide a graphical user interface (e.g. for the software experience 806). The input/output controller 812 is also arranged to receive and process input from one or more devices, such as a user input device 816 (e.g. a mouse, keyboard, camera, microphone or other sensor), e.g. so that a user can scroll forwards and backwards in time to view generated interactions between beads displayed within the GUI of the software experience. In some examples the user input device 816 may detect voice input, user gestures or other user actions and may provide a natural user interface (NUI). This user input may be used to control the software experience 806. In various embodiments the display device 814 may also act as the user input device 816 if it is a touch sensitive display device. The input/output controller 812 may also output data to devices other than the display device, e.g. a locally connected printing device (not shown in FIG. 8).

Any of the input/output controller 812, display device 814 and the user input device 816 may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The autonomous generation of interactions as described herein can be used as part of an entertainment application, in which users create characters in a virtual world, which can interact with one another to live virtual lives—make virtual friendships, enemies or other relationships, take up virtual careers or hobbies, etc. The users actions such as choosing which beads to put on a connection element and in which order, or rearranging these over time, the meetings they have with other wearers of this technology (deliberate or unintentional as they pass in the street), and also swapping of beads can be used to generate entertaining stories in this virtual world which users can follow.

Although the description above refers to the connecting element detecting the presence of beads attached to it or to a nearby connecting element, in various examples the beads may in addition be detected by a separate computing-based device (e.g. a mobile phone equipped with an NFC reader). In examples where a user can program the bead data stored within a bead, the bead data may be modified using an application running on a computing-device which can detect and communicate with the beads directly. Alternatively, this may be done via the connecting element.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. An interactive article of manufacture comprising a connecting element, wherein the connecting element comprises:
   one or more hardware processors;
   one or more storage devices; and
   instructions stored in the one or more storage devices that when executed configure the connecting element to perform operations comprising:
      detecting a first smart bead attached to the connecting element and a second smart bead attached to a proximate connecting element;
      generating a first displayable interaction between the first smart bead and the second smart bead, such interaction being variable based on reprogrammable data stored on one or both of the first smart bead and the second smart bead;
      modifying the reprogrammable data;
      generating a second displayable interaction between the first smart bead and the second smart bead, the second displayable interaction differing from the first displayable interaction based on a modification of the reprogrammable data; and storing interaction data in the one or more storage devices about the interactions, the interaction data comprising at least an identifier for the first bead, an identifier for the second bead, and information to visually present a graphical depiction of one or both of the first displayable interaction and the second displayable interaction in a graphical user interface.

2. The interactive article of manufacture according to claim 1, the operations further comprising wirelessly transmitting the interaction data to application software to enable viewing of one or both of the first displayable interaction and the second displayable interaction.

3. The interactive article of manufacture according to claim 2, wherein the interaction data further comprises details of the first displayable interaction, the details including at least one of a characteristic of the first displayable interaction, an outcome of the first displayable interaction, a location of the first displayable interaction, or an identity of a third smart bead in the proximity of the first displayable interaction.

4. The interactive article of manufacture according to claim 1, wherein the first smart bead is one of a plurality of smart beads attached to the connecting element, and wherein the operations further comprise detecting an order of the plurality of smart beads or a location of the plurality of smart beads.

5. The interactive article of manufacture according to claim 1, wherein the first smart bead is arranged to be attached to the connecting element and wherein the first smart bead includes a smart bead memory to store an identifier for the first smart bead and reprogrammable data related to the first smart bead.

6. The interactive article of manufacture according to claim 5, wherein the reprogrammable data related to the first smart bead is associated with a character, an environment, or an object that the first smart bead represents.

7. The interactive article of manufacture according to claim 5, wherein the first smart bead further comprises at least one of a display or an actuator and wherein the generating the first displayable interaction further comprises triggering a light feedback via the display or a touch feedback.

8. The interactive article of manufacture according to claim 5, wherein the first smart bead comprises one or more electrical contacts positioned so as to make contact with one or more electrical contacts on the connecting element when attached to the connecting element.

9. The interactive article of manufacture according to claim 1, wherein the generating the second displayable interaction further comprises selecting both of the first smart bead and the second smart bead and generating a displayable interaction between the first smart bead and the second smart bead, wherein at least one of the selection or the generation is dependent upon the reprogrammable data stored in one or both of the first smart bead or the second smart bead.

10. The interactive article of manufacture according to claim 1, wherein the generating the first displayable interaction further comprises updating the reprogrammable data stored in at least one of the first smart bead or the second smart bead in response to generating the first displayable interaction.

11. The interactive article of manufacture according to claim 1, wherein the connecting element comprises a battery and is arranged to supply power to the first smart bead.

12. A method comprising:
receiving, at a computing device, interaction data from an interactive article of manufacture, the interactive article of manufacture comprising two or more smart beads attached to a connecting element and the interaction data comprising identifiers for the two or more smart beads and details of one or more displayable interactions between the two or more smart beads, the displayable interactions generated being variable based on reprogrammable data stored on one or both of the first smart bead and the second smart bead, wherein the reprogrammable data is modified after generating a first displayable interaction of the one or more displayable interactions and before generating a second displayable interaction of the one or more displayable interactions, and wherein the second displayable interaction differs from the first displayable interaction based on a modification of the reprogrammable data;
representing, within a graphical user interface of application software, at least one of the one or more displayable interactions between the two or more smart beads based on the interaction data; and
modifying functionality within the application software based on the interaction data.

13. The method according to claim 12, further comprising providing an interface within the application software to enable a user to review the one or more displayable interactions between the two or more smart beads.

14. The method according to claim 12, wherein a smart bead of the two or more smart beads represents a character, an environment, or an object and wherein the representing comprises displaying a still image or an animated sequence depicting the character, the environment, or the object.

15. The method according to claim 12, wherein the modifying the functionality comprises enabling a function within the application software, wherein the function enabled is dependent upon the identifiers for the two or more smart beads.

16. The method according to claim 12, wherein the application software is an interactive software experience and the method further comprises transmitting other data to the interactive article of manufacture, the other data being dependent upon user interaction with the interactive software experience.

17. The method according to claim 12, further comprising:
detecting, in the connecting element, the two or more smart beads attached to the connecting element;
detecting, in the connecting element, one or more additional smart beads attached to a proximate connecting element;
without explicit user input, generating an inter-connecting-element interaction between at least one of the two or more smart beads attached to the connecting element and at least one of the one or more additional smart beads attached to the proximate connecting element; and
transmitting information to the application software about at least one of:
at least one of the two or more smart beads or the one or more additional smart beads; or
the inter-connecting-element interaction.

18. A system comprising an interactive article of manufacture, the interactive article of manufacture comprising a plurality of smart beads on a connecting element, a smart bead of the plurality of smart beads including a smart bead memory to store a unique identifier for the smart bead and reprogrammable data, the connecting element comprising:
one or more hardware processors;
one or more storage devices; and instructions stored in the one or more storage devices that when executed configure the connecting element to perform operations comprising:
  detecting a presence of a first smart bead and a second smart bead of the plurality of smart beads;
  collecting a first unique identifier for the first smart bead and a second unique identifier for the second smart bead;
  in response to the detecting, generating a first displayable interaction between the first smart bead and the second smart bead based on the reprogrammable data stored within one or both of the first smart bead and the second smart bead;
  modifying the reprogrammable data;
  generating a second displayable interaction between the first smart bead and the second smart bead, the second displayable interaction differing from the first displayable interaction based on a modification of the reprogrammable data; and
  wirelessly transmitting information about the first displayable interaction and the second displayable interaction to application software, the information including at least the first unique identifier, the second unique identifier, and information to visually present a graphical depiction of one or both of the first displayable interaction and the second displayable interaction in a graphical user interface.

19. The system according to claim 18, the application software including device-executable instructions that, when executed by a computing system, direct the computing system to display the graphical depiction of one or both of the first displayable interaction and the second displayable interaction within the graphical user interface.

20. The system according to claim 18, the operations further comprising detecting a location of the smart bead or an order of a plurality of smart beads on the connecting element.

* * * * *